United States Patent [19]

Najjar

[11] Patent Number: 4,654,164
[45] Date of Patent: Mar. 31, 1987

[54] PARTIAL OXIDATION PROCESS
[75] Inventor: Mitri S. Najjar, Hopewell Junction, N.Y.
[73] Assignee: Texaco Inc., White Plains, N.Y.
[21] Appl. No.: 797,360
[22] Filed: Nov. 12, 1985
[51] Int. Cl.$^4$ ................................................ C01B 3/31
[52] U.S. Cl. ...................................... 252/373; 48/215
[58] Field of Search ........................... 252/373; 48/215
[56] References Cited
U.S. PATENT DOCUMENTS
2,932,561  4/1960  Paull ...................................... 48/215

Primary Examiner—Howard T. Mars
Attorney, Agent, or Firm—Robert A. Kulason; James J. O'Loughlin; Albert Brent

[57] ABSTRACT

Synthesis gas is produced by the partial oxidation of a fuel feedstock comprising a heavy liquid and/or petroleum coke having a nickel, iron, and vanadium-containing ash. A copper-containing additive is introduced into the reaction zone along with the feed. The additive combines with at least a portion of the nickel and iron constituents and the sulfur found in the feedstock to produce a liquid phase washing agent that collects and transports at least a portion of the vanadium-containing oxide laths and spinels and other ash components out of the reaction zone. In another embodiment, a minor amount of a second additive comprising a compound of an element selected from the group consisting of iron, calcium, magnesium, chromium, and mixtures thereof is introduced into the partial oxidation reaction zone along with the fuel feedstock and the copper-containing additive. In still another embodiment, the copper-containing additive with or without a supplemental compound of an element selected from the group consisting of iron, calcium, magnesium, chromium, and mixtures thereof is uniformly dispersed in petroleum coke having a nickel, iron, and vanadium-containing ash. By this method molten slag having a reduced viscosity and containing the nickel, iron, and vanadium-containing impurities from the feedstock are readily removed from the partial oxidation gas generator at a lower temperature. Further, the life of the refractory lining of the partial oxidation gas generator is extended.

31 Claims, 1 Drawing Figure

VANADIUM-CONTAINING SPINEL
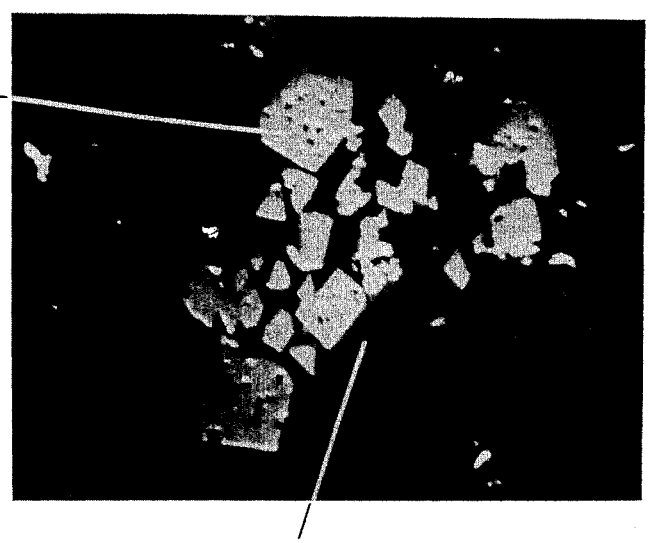
LIQUID PHASE WASHING AGENT

PARTIAL OXIDATION PROCESS

FIELD OF THE INVENTION

This invention relates to the partial oxidation of ash-containing heavy liquid hydrocarbonaceous fuels, ash-containing petroleum coke, or mixtures thereof to produce gaseous mixtures comprising $H_2+CO$. More particularly it pertains to copper-containing additive system for removing nickel and vanadium-containing contaminants along with other molten ash components which are produced during the partial oxidation of a heavy liquid hydrocarbonaceous fuel having a nickel, iron, and vanadium-containing ash, petroleum coke having a nickel, iron, and vanadium-containing ash or mixtures thereof to produce synthesis gas, reducing gas, or fuel gas.

The partial oxidation of liquid hydrocarbonaceous fuels such as petroleum products and slurries of solid carbonaceous fuels such as coal and petroleum coke are well known processes. The foreseeable trend for petroleum reserves is that the produced crude will be increasingly heavier and of poorer quality. To compensate for this trend, refiners must employ more "bottom of the barrel" upgrading to provide the desired light products. The current industry workhorse to provide this upgrading is some type of coking operation (either delayed or fluid). A good deal of current refinery expansion includes the installation or expansion of coker units, and thus, coking will be a process of general use for some time to come.

A major drawback for coking is the disposal of the product coke. With a reasonably clean coker feed, the product coke has been substituted for applications requiring only relatively pure carbon, such as electrode manufacture. However, with the feed crudes becoming poorer, there are compounding factors affecting coker operations. First, since the crudes contain more contaminants, i.e. sulfur, metals (predominately vanadium, nickel, and iron), and ash, and these contaminants are concentrated in the product coke, this coke is of a much poorer quality and is excluded from its normal product applications. Second, because the crudes are heavier, i.e., contain more coke precursors, more of this poorer quality coke is produced from each barrel of ash-containing heavy liquid hydrocarbonaceous fuel. The manufacture of petroleum coke pellets by a delayed coking process is described in coassigned U.S. Pat. No. 3,673,080. A fluid coking process is described in U.S. Pat. No. 2,709,676.

The Texaco partial oxidation gasification process offers an alternative processing route for the coke or the ash-containing heavy liquid hydrocarbonaceous fuel. For example, water slurries of petroleum coke are reacted by partial oxidation in coassigned U.S. Pat. No. 3,607,157. Gasification is often cited as a convenient means of coke disposition. The Flexicoking Process is an integrated coker/gasifier operation but is often criticized because of the gasifier design. Further, no molten petroleum coke ash having a reduced ash fusion temperature is produced. The decision to use gasification as a coke disposal means is generally based on economics. The expected rise in energy costs and legislation (primarily Canadian) requiring total use of feed crude should shortly bring about a great utilization of petroleum coke feeds to the partial oxidation gas generator.

Previous gasification runs with delayed coke and ash-containing heavy liquid hydrocarboneous fuel gave rise to some unexpected operating problems. The ash, which normally melts and is discharged from the gasifier as a slag, was not melting completely and being discharged but was building up on the walls of the refractory. Vanadium and nickel constituents of the ash in said materials collected on the gasifier walls and formed oxides during shut-down. Upon subsequent exposure of the gasifier walls to air these deposits involving vanadium can catch fire with vanadium converting to the lower melting $V_2O_5$ or metal vanadate states. The strong solvent action of the vanadium oxide on the refractory lining contributed to the clogging of the outlet in the bottom of the gasifier. Nickel impurities may under certain conditions form troublesome nickel carbonyl deposits downstream in the system. Fluxing as used in coal operations and in U.S. Pat. Nos. 1,799,885 and 2,644,745 do not provide a solution to applicant's problem involving troublesome vanadium and nickel. The subject invention is an improvement in the art since it permits long time operation of the partial oxidation gas generator without shut-down due to failure of the refractory lining in the reaction zone that was brought about by the presence of vanadium.

SUMMARY OF THE INVENTION

This is a process for the production of gaseous mixtures comprising $H_2+CO$ by the partial oxidation of a feedstock comprising a heavy liquid hydrocarbonaceous fuel having a nickel, iron, and vanadium-containing ash or petroleum coke having a nickel, iron, and vanadium-containing ash, or mixtures thereof. Further, said feedstock includes a minimum of 0.5 wt. % of sulfur; and said ash includes a minimum of 5.0 wt. % of vanadium, a minimum of 0.5 ppm (parts per million) nickel, such as about 2.0 to 4000 ppm, and a minimum of 0.5 ppm iron, such as about 2.0 to 2000 ppm. The process includes the steps of (1) mixing together a copper-containing additive with said feedstock; wherein the weight ratio of copper-containing additive to ash in the fuel feedstock is in the range of about 1.0–10.0, and there is at least 10 parts by weight of copper for each part by weight of vanadium; (2) reacting said mixture from (1) at a temperature in the range of about 2200° F. to 2900° F. and a pressure in the range of about 5 to 250 atmospheres in a free-flow refractory lined partial oxidation reaction zone with a free-oxygen containing gas in the presence of a temperature moderator and in a reducing atmosphere to produce a hot raw effluent gas stream comprising $H_2+CO$ and molten slag; and where in said reaction zone said copper-containing additive combines with at least portion of said nickel and iron constituents and sulfur found in the feedstock to generate a liquid phase washing agent that collects and transports at least a portion of the vanadium-containing oxide laths and spinels and other ash components and refractory out of the reaction zone; and (3) separating nongaseous materials from said hot raw effluent gas stream.

In another embodiment, a mixture of heavy liquid hydrocarbonaceous fuel having a nickel, iron and vanadium-containing ash and said copper-containing additive is fed to a coking system to provide petroleum coke with a nickel, iron, and vanadium-containing ash, and with said additive being uniformly dispersed throughout. This petroleum coke is then reacted in the partial oxidation gas generator to produce synthesis gas, reducing gas, or fuel gas.

In still another embodiment, a small amount of an additional additive comprising a compound of an element selected from the group consisting of iron, magnesium, chromium, and mixtures thereof such as oxides is introduced into the reaction zone along with the copper-containing additive. The magnesium and chromium further increase the life of the refractory lining. Iron, nickel and copper will combine to form the liquid phase washing agent.

DISCLOSURE OF THE INVENTION

The partial oxidation of heavy liquid hydrocarbonaceous fuel and petroleum coke are described respectively in coassigned in U.S. Pat. Nos. 4,411,670 and 3,607,156, which are incorporated herein by reference. Further, suitable free-flow refractory lined gas generators and burners that may be used in the production of synthesis gas, reducing gas, or fuel gas from these materials are also described in the aforesaid references. Advantageously, the subject process uses relatively inexpensive feedstocks comprising heavy liquid hydrocarbonaceous fuel and/or petroleum coke feedstocks having nickel and vanadium-containing ashes. Further, said feedstock includes a minimum of 0.5 wt.% of sulfur, such as at least 2.0 wt.% sulfur; and said ash includes a minimum of 5.0 wt.% of vanadium, a minimum of 0.5 ppm nickel, such as about 2.0 to 4000 ppm, and a minimum of 0.5 ppm iron, such as about 2.0 to 2000 ppm.

By definition, the term heavy liquid hydrocarbonaceous material or fuel having a nickel, iron, and vanadium-containing ash is a petroleum or coal derived fuel selected from the group consisting of virgin crude, residua from petroleum distillation and cracking, petroleum distillate, reduced crude, whole crude, asphalt, coal tar, coal derived oil, shale oil, tar sand oil, and mixtures thereof.

By definition, the term petroleum coke having a nickel, iron, and vanadium-containing ash is petroleum coke made from ash containing heavy liquid hydrocarbonaceous fuel by conventional coking methods such as by the delayed or fluid coking process, such as described in coassigned U.S. Pat. No. 3,673,080, which is incorporated herein by reference. The fuel feedstock to the partial oxidation gas generator may be a pumpable slurry of petroleum coke in water, liquid hydrocarbonaceous fuel, or mixtures thereof.

Closer study of the ashes derived from the partial oxidation, without an additive, of a feedstock comprising heavy liquid hydrocarbonaceous fuels and/or petroleum coke having nickel, iron, and vanadium-containing ashes shows that they are largely composed of oxide and sulfide compounds of vanadium, nickel, iron, along with some normally occurring mineral matter species. The expression "and/or" as used herein means either one or both of the items or materials being specified. Vanadium-containing oxide laths are present selected from the group consisting of V, V+Al, V—Mg—V—Ca, V+Mg, and mixtures thereof. Vanadium-containing spinels are present of the spinel-type aluminate phases with any metals selected from the group consisting of V, Cu, Cr, Al, Mg and mixtures thereof. The presence of abundant interlocking needle to lath-like crystals is the cause of the high viscosity of the slag.

The metals present in the ash provide a system that is significantly different from that occurring in coal. A further factor is that the total ash content of the petroleum coke or heavy liquid hydrocarbonaceous fuel may be only about one-half to 5 weight percent (wt.%), whereas coal typically contains 10–20 wt.% ash. The comparatively low ash concentration in petroleum coke and heavy liquid carbonaceous fuel may be the reason why the ash removal problem is only noticed after prolonged gasifier runs. The chance for effective ash and additive mixing that is necessary to wash the vanadium constituents out of the reaction zone or for effective fluxing is therefore greatly reduced.

It is theorized that in the heavy liquid hydrocarbonaceous material and petroleum coke systems, a good deal of the ash material is liberated as individual molecular species. This is because upon vacuum distillation or coking, the metallic species in the crude, which are generally presented as porphyrin type structures (metal atoms, oxides or ions thereof confined in an organic framework), are entrapped within the collapsed carbon matrix.

Problems arise when the heavy metal constituents build-up in the system. In particular, vanadium and nickel are known to accumulate on the walls of the refractory lined reaction zone of the partial oxidation gas generator and not flow smoothly from the gasifier under normal gasifier conditions. During shut down and subsequent exposure of the gasifier walls to air, these deposits involving vanadium can catch fire with the vanadium converting to the lower melting $V_2O_5$ or metal vanadate states. These materials prove to be very corrosive to refractory thereby decreasing the life of the refractory lining of the reaction zone. These problems and others are minimized by the subject process in which the amount of vanadium constituents remaining in the reaction zone are substantially reduced or eliminated.

This invention provides an improved copper-containing additive. Further, a means of introducing this addition agent into the system to give maximum effectiveness is provided.

The copper-containing additive preferably comprises a copper compound, preferably copper oxide. In the reaction zone of the partial oxidation gas generator, the additive combines with at least a portion, such as substantially all or a large fraction e.g. about 40 to 100 wt. %, say about 70 to 90 wt. % of the nickel and iron constituents, and the sulfur found in the feedstock to produce a low viscosity liquid phase washing agent or carrier. Advantageously, the sulfur potential in the gas and downstream gas cleaning costs are substantially reduced or possibly eliminated. This washing agent is in the liquid phase at the temperature prevailing in the reaction zone and substantially comprises in wt. %: copper sulfide about 75 to 95, such as about 80 to 90; nickel sulfide about 0.5 to 3, such as about 1 to 2; copper oxide about 2 to 9, such as about 3 to 6, iron sulfide about 0.4 to 2, such as about 0.75 to 1.5, and iron oxide about 0.1 to 1.0, such as about 0.4 to 0.8. The viscosity of this washing agent at 1100° C. is less than 15 poises. Further, it was unexpectedly found that this liquid phase washing agent has a strong wetting capability for the high temperature non-flowing vanadium-containing oxide laths and spinels. This washing agent functions in a completely different manner than that of a fluxing additive which may be used for example to solubilize slag constituents in coal. For example, this washing agent does not solubilize the troublesome vanadium-containing oxide laths and spinels. Rather, it serves as a carrier and washes them out of the reaction zone. This washing agent washes at least a portion, such as from about 40 to 100 wt. %, such as about 60 to 80 wt. %, and preferably all of the vanadium-containing contaminants out of the reaction zone of the partial oxidation gas generator. The mixtures of this liquid phase washing agent and vanadium oxide is referred to herein as slag and comprises about 1 to 10 wt. %, such as about 4 to 8 wt. % of vanadium oxide.

In another embodiment, it was unexpectedly found that other benefits could be achieved by introducing into the partial oxidation reaction zone a mixture comprising said ash-containing heavy liquid hydrocarbonaceous fuel and/or petroleum coke, the copper-containing additive, and a second additive comprising a compound of an element selected from the group consisting of iron, calcium, magnesium, chromium, and mixtures thereof. Alternatively, a mixture comprising said ash-containing heavy liquid hydrocarbonaceous fuel, copper-containing additive, and said second additive comprising a compound of an element selected from the group consisting of iron, calcium, magnesium, chromium, and mixtures thereof is introduced into a coking zone, to be further described. The additive materials are thereby uniformly dispersed in the petroleum coke that is produced in the coking zone. The addition of the aforesaid supplemental amount of magnesium and/or chromium compound saturates the slag leaving the partial oxidation gasifier with respect to these constituents, thereby preventing their dissolution from the refractory. The life of the refractory lining is thereby extended. Compounds of magnesium, chromium, and mixtures thereof may be introduced along with the copper-containing additive in the total amount of about 1.0 to 10.0 wt. % of said copper-containing additive. The addition of iron and calcium compounds, preferably oxides, act as a slag modifying additive for the petroleum coke and/or heavy liquid hydrocarbonaceous fuel. The slag fluid phase may be thereby generated at a lower temperature and at a faster rate. A suitable amount of copper-containing additive is introduced into the reaction zone along with the fuel feedstock in order to satisfy the following two ratios: (i) a wt. ratio of copper-containing additive to ash (noncombustable material) in the fuel feedstock in the range of about 1.0-10.0, such as at least 2.0, say about 5.0, (this ratio may be also expressed as about 5 parts by wt. of copper-containing additive per part by wt. of ash in the fuel feedstock); and (ii) at least 10 parts by weight, such as about 10-30, say 20 parts by weight of copper for each part by weight of vanadium.

Advantageously by the subject process, the molten slag which is produced in the reaction zone has a low viscosity e.g. less than 15 poises at 1100° C., in comparison with prior art high viscosity slag. This facilitates slag removal. Further, at shut-down of the gasifier, the refractory walls of the reaction zone are provided clean with substantially no net accumulation of vanadium contaminants.

The partial oxidation reaction takes place in a reducing atmosphere under the following conditions: temperature—2200° F. to 2900° F., such as about 2300° F. to 2700° F.; say about 2725° F. to 2825° F.; pressure—about 5 to 250 atmospheres, such as about 15 to 200 atmospheres; when steam or water is used as a temperature moderator, the $H_2O$/fuel weight ratio is in the range of about 0.1 to 5.0, such as about 0.2 to 0.9; and the atomic ratio of free oxygen to carbon in the fuel (O/C ratio) is in the range of about 0.6 to 1.6, such as about 0.8 to 1.4.

The composition of the hot, raw effluent gas stream directly leaving the reaction zone of the free-flow partial oxidation gas generator is about as follows, in mole percent: $H_2$ 10 to 70, CO 15 to 57, $CO_2$ 0.1 to 25, $H_2O$ 0.1 to 20, $CH_4$ nil to 60, $H_2S$ nil to 2, COS nil to 0.1, $N_2$ nil to 60, and Ar nil to 2.0. Particulate carbon is present in the range of about 0.2 to 20 weight % (basis carbon content in the feed). Ash is present in the range of about 0.5 to 5.0 wt. %, such as about 1.0 to 3.0 wt. % (basis total weight of fuel feed). Depending on the composition after removal of the entrained particulate carbon and ash by quench cooling and/or scrubbing with water and with or without dewatering the gas stream may be employed as synthesis gas, reducing gas or fuel gas.

Another aspect of this invention is that the copper-containing additive may be selected on the basis of serendipitous catalytic properties in addition to its use in the generation of the washing agent, as previously described. For example, it may act to produce more and/or a better quality of light products from the coker operation. It may also aid in the gasification reactions either by increasing the reaction rate and thus the throughput capacity of the gasifier or by increasing the conversion of the soot and thus the overall efficiency of the process. Again, however, this invention does not depend on the catalytic properties of the copper-containing additive.

It was unexpectedly found that a preferred copper-containing additive for mixing with the heavy liquid hydrocarbonaceous material having a nickel, iron, and vanadium-containing ash or petroleum coke having a nickel, iron, and vanadium-containing ash includes copper compounds selected from the group consisting of oxides, sulfates, carbonates, cyanides, chlorides, nitrates, and mixtures thereof. In another embodiment, the copper compound is a water soluble copper salt. In still another embodiment the copper compound is a cuprous or cupric organic compound selected from the group consisting of naphthenates, oxalates, acetates, benzoates, oleates, tartrates, and mixtures thereof.

In the preferred embodiment of the subject invention, the aforesaid mixture of fuel feedstock comprising heavy liquid hydrocarbonaceous fuel having a nickel, iron, and vanadium-containing ash and/or the petroleum coke having a nickel, iron, and vanadium-containing ash, and the copper-containing additive are introduced into the partial oxidation gasifier. Optionally, there may be included in this feed mixture a comparatively small amount of a comminuted second additive comprising a compound selected from the group of elements consisting of iron, calcium, magnesium, chromium, and mixtures thereof. In another embodiment, the copper-containing additive is mixed with the heavy liquid hydrocarbonaceous material having a nickel, iron, and vanadium-containing ash and this feed mixture is then introduced into a conventional coking unit to produce petroleum coke. Optionally, there may be included in this feed mixture a comparatively small amount of a comminuted second additive comprising a compound selected from the group of elements consisting of iron, calcium, magnesium, chromium, and mixtures thereof. By this means, the finely ground copper-containing additive and the second additive comprising a compound of an element selected from the group consisting of iron, calcium, magnesium, chromium, and mixtures thereof may be intimately mixed throughout the petroleum coke product. The preferable particle size of the comminuted copper-containing additive; the comminuted second additive comprising a compound of an element selected from the group consisting of iron, calcium, magnesium, chromium, and mixtures thereof; and the comminuted petroleum coke is such that substantially all of the material passes through a sieve in the range of ASTM E-11 Standard Sieve Designation about 425 um (microns) to 38 um (microns), or below. The ingredients of the aforesaid mixtures may be separately ground and then mixed together. Alternatively, the ingredients may be wet or dry ground together. Intimate mixing of the solid materials is thereby achieved, and the particle sizes of each of the solid materials in the mixture may be substantially the same. The dry ground mixture may be mixed with water or a liquid hydrocarbonaceous material or both to produce a pumpable slurry having a solids content in the range of about 50–65 wt. %. Alternatively, the solid materials may be wet ground with the liquid slurry medium. Alternatively, the mixture of particulate solids may be entrained in a gaseous medium and then introduced into the gas generator. The gaseous transport medium may be selected from the group consisting of steam, $CO_2$, $N_2$, free-oxygen containing gas, recycle synthesis gas, and mixtures thereof.

In the embodiment wherein ground copper-containing additive is mixed with the heavy liquid hydrocarbonaceous fuel having a nickel, iron, and vanadium-containing ash and fed into a coker, the copper-containing additive, with or without said second additive comprising a compound selected from the group of elements consisting of iron, calcium, magnesium, aluminum, and mixtures thereof, may be introduced directly into the ash-containing petroleum liquid feed to the vacuum distillation tower, which normally precedes the coker unit. In either unit operation (coking or distillation), substantially all of the copper-containing additive and said second additive, if any should stay behind in the desired bottoms stream. In other words, there should be little, if any, carry over of the additive with the lighter products. A possible advantage for mixing the additive with the vacuum tower feeedstream in preference to the bottoms stream (i.e. coker feed) is that the feed to the vacuum tower is significantly less viscous than the bottoms from the vacuum tower. A more thorough mixing may be thereby effected.

For example, a mixture comprising a high boiling liquid petroleum i.e. heavy liquid hydrocarbonaceous fuel having a nickel, iron, and vanadium-containing ash, the comminuted copper-containing additive, and said second additive, if any, at a temperature in the range of about 650° F. to 930° F. is introduced into a delayed coking zone, for example by way of line 33, such as shown and described in coassigned U.S. Pat. No. 3,673,080, which is incorporated herein by reference. At a temperature in the range of about 800° F. to 895° F. and a pressure in the range of about 20 to 60 psig, uncondensed hydrocarbon effluent vapor and steam are removed overhead and petroleum coke in admixture with the copper-containing additive and the second additive, if any, is removed from the bottom of said delayed coking zone.

In another embodiment, a mixture comprising a high boiling liquid petroleum having a nickel, iron, and vanadium-containing ash and said comminuted copper-containing additive and said second additive, if any, at a temperature in the range of about 550° F. to 750° F. is introduced into a fluidized bed coking zone for example by way of line 31, such as shown and described in U.S. Pat. No. 2,709,676, which is incorporated herein by reference. At a temperature in the range of about 1000° F. to 1200° F. and a pressure in the range of about 10 to 20 psig, uncondensed hydrocarbon effluent vapor and steam are removed overhead and said petroleum coke is removed from the bottom of said coking zone.

In other embodiments, this invention may be applied to other similar petroleum processes that produce a stream suitable for gasification. Any "bottom of the barrel" process that does not upgrade the bottoms or residue stream to extinction must ultimately produce such a stream. These streams, either liquid or normally solid but pumpable at elevated temperatures, will produce the same gasification problems as discussed for coke. Thus, the invention of introducing said copper-containing additive, with or without said second additive, as part of the petroleum processing prior to gasification should, depending on the specific process, produce a feedstock that will be free of the gasification problems mentioned above. Most of these processes employ vacuum distillation as pretreatment. Accordingly, as described above, the copper-containing addition agent, with or without said second additive, may be mixed with the vacuum distillation feed having a nickel, iron, and vanadium-containing ash. The additives will then emerge from the distillation column in the bottoms stream. In turn, the bottoms stream is the feed stream for the upgrading process. This incorporation of said additives should not adversely affect these processes, and the additives should ultimately emerge with the vanadium-rich residue stream from each respective process. In all of these processes, this residue stream should be suitable for gasification by partial oxidation.

In the embodiment of the invention in which comparatively small amounts of a second additive comprising iron and/or calcium compound are introduced along with the copper-containing agent, it was unexpectedly found that the softening temperature of the copper-containing addition agent could be reduced about 100°–300° F., such as about 200° F. The supplemental iron and/or calcium compound may be mixed with the previously described feedstock and the copper-containing addition agent and the mixture may be then introduced into the partial oxidation reaction zone. Alternatively, a mixture comprising the iron and/or calcium compound, copper containing addition agent, and liquid hydrocarbonaceous fuel may be introduced into a coking zone, as previously described. The calcium compound may be selected from the group consisting of oxide, sulfate, sulfide, carbonate, cyanide, chloride, nitrate, and mixtures thereof. The iron compound may be selected from the group consisting of oxide, sulfate, sulfide, carbonate, cyanide, chloride, nitrate, and mixtures thereof. By adding iron and/or calcium in this manner, the partial oxidation gas generator may be started up at a lower temperature e.g. about 100° to 300° F. lower. The supplemental compound of iron, calcium, or both is introduced into the partial oxidation reaction zone only at start-up. It may be in admixture with the feedstock, the copper-containing addition agent, or both. The additional calcium compound is introduced in the critical amount of about 2.0 to 8.0 wt. % or below of the copper-containing addition agent. The additional iron compound may be introduced in the amount of about 1.0 to 20.0 wt. %, such as about 2.0 to 8.0 wt. % of the amount of copper-containing addition agent that is introduced. The iron and/or calcium compound will lower the softening temperature of the copper-containing addition agent, thus enhancing the rate of sulfur pick-up in the slag. However, it was found that when the addition of calcium compound exceeded 8.0 wt. % of the copper-containing addition agent, then calcium sulfide and calcium carbonate would clog up the central passage of the dip tube thereby blocking the discharge of the hot effluent gas stream from the reaction zone into the quench water. Shortly after start-up when the sulfur begins to transfer into the molten slag, the liquid sulfide slag of copper, nickel, and iron in the fuel feed will lower the softening temperature of the copper-containing agent thus eliminating thereafter the need of introducing the additional iron and/or calcium compound. Advantageously, by the subject process the production of metal carbonyls in the raw synthesis gas stream is reduced or eliminated. Metal carbonyls are responsible for the FeS deposits that under certain conditions may be found in the absorber section of amine gas scrubbers and for the deposits of FeS and NiS that may be found in spiral-wound heat exchangers of the Rectisol methanol regeneration systems. Further, it was unexpectedly found that the conversion of CuO to CuS increased the gas phase oxygen potential and reduced the sulfur potential e.g. $H_2S$ and COS in the synthesis gas stream. Downstream gas purification costs are thereby substantially reduced.

EXAMPLE

The following examples are offered as a better understanding of the present invention, but the invention is not to be construed as limited thereto.

Example I

Synthesis gas substantially comprising in mole % dry basis $H_2$ 25 to 45, CO 20 to 50, $CO_2$ 5 to 35, $CH_4$ 0.06 to 8.0, and $CO_2+H_2S$ 0.1 to 2.0 is produced in a free-flow refractory lined partial oxidation reaction zone, such as that shown and described in coassigned U.S. Pat. No. 3,607,157, which is incorporated herein by reference. The feedstock comprises an atomized aqueous dispersion or a dispersion of substantially dry petroleum coke having a nickel, iron, and vanadium-containing ash and being entrained in a gaseous transport medium comprising a mixture of free-oxygen containing gas and steam. The ash in the petroleum coke comprises about 12.0 wt. % of vanadium, about 4.0 wt. % of nickel, and about 3.0 wt. % of iron. About 3.2 wt. % of sulfur is present in the petroleum coke. The petroleum coke has a nickel, iron, and vanadium-containing ash and also has uniformly dispersed therein a copper-containing additive comprising about 100 wt. % of copper oxide. The wt. ratio of copper-containing additive to the ash in said petroleum coke is about 5. The weight ratio of copper to vanadium in the reaction zone is about 16. In other runs the petroleum coke having a nickel, iron, and vanadium-containing ash is mixed with the copper-containing additive and the supplemental iron and/or calcium compound and is introduced into the free-flow partial oxidation zone as a pumpable slurry of petroleum coke in water. The solids content of the slurry is about 60 weight percent.

The petroleum coke is reacted with a free-oxygen containing gas e.g. air, oxygen-enriched air, substantially pure oxygen, in the presence of a temperature moderator e.g. $H_2O$, $CO_2$, $N_2$, in the refractory lined partial oxidation reaction zone at an autogenous temperature of about 2750° F. and a pressure of about 6 atmospheres. The molten slag droplets are readily separated from the hot effluent gas stream leaving the reaction zone by gravity or by quenching and/or scrubbing the gas stream with water or other gas scrubbing medium. The ash fusion temperature (°F.) for the liquid washing agent and associated ash with or without supplemental iron and/or calcium compound was below 2200° F. In comparison, the ash fusion temperature of the coarse slag with no copper-containing additive was greater than 2750° F. A typical chemical composition of the liquid phase washing agent and ash is shown in Table I below.

TABLE I

| Chemical Composition of Liquid Phase Washing Agent and Ash (wt. %) | | | | | | | | |
|---|---|---|---|---|---|---|---|---|
| CuS | NiS | FeS | FeO | CuO | CaO | $SiO_2$ | $V_2O_3$ | Others[1] |
| 77.1 | 1.8 | 2.3 | 0.4 | 3.4 | 0.3 | 1.6 | 6.7 | 7.4 |

[1]minor ash components and refractory pick-up

A photomicrograph (enlarged 500×) showing a back scattered electron image of a cross-section of the slag produced from the liquid phase washing agent and illustrating the undissolved vanadium-containing oxide laths and spinels in a matrix of liquid phase washing agent is shown in the FIGURE.

Various modifications of the invention as herein before set forth may be made without departing from the spirit and scope thereof, and therefore, only such limitations should be made as are indicated in the appended claims.

I claim:

1. A process for the production of gaseous mixtures comprising $H_2+CO$ by the partial oxidation of a fuel feedstock comprising a heavy liquid hydrocarbonaceous fuel having a nickel, iron, and vanadium-containing ash or petroleum coke having a nickel, iron, and vanadium-containing ash, or mixtures thereof; and said feedstock includes a minimum of 0.5 wt. % of sulfur; and said ash includes a minimum of 5.0 wt. % vanadium, a minimum of 0.5 ppm nickel, and a minimum of 0.5 ppm iron, said process comprising:
   (1) mixing together a copper-containing additive with said fuel feedstock; wherein the weight ratio of copper-containing additive to ash in said fuel feedstock is in the range of about 1.0–10.0, and there is at least 10 parts by weight of copper for each part by weight of vanadium;
   (2) reacting said mixture from (1) at a temperature in the range of 2200° F. to 2900° F. and a pressure in the range of about 5 to 250 atmospheres in a free-flow refractory lined partial oxidation reaction zone with a free-oxygen containing gas in the presence of a temperature moderator and in a reducing atmosphere to produce a hot raw effluent gas stream comprising $H_2+CO$ and entrained molten slag; and where in said reaction zone said copper-containing additive combines with at least a portion of said nickel and iron constituents and sulfur found in the feedstock to produce a liquid phase washing agent that collects and transports at least a portion of the vanadium-containing oxide laths and spinels and other ash components and refractory out of the reaction zone; and
   (3) separating nongaseous materials from said hot raw effluent gas stream.

2. The process of claim 1 wherein said copper-containing additive comprises a copper compound selected from the group consisting of oxide, sulfide, sulfate, carbonate, cyanide, chloride, nitrate, and mixtures thereof.

3. The process of claim 1 wherein said copper-containing additive comprises a cuprous or cupric organic compound selected from the group consisting of naphthenates, oxalates, acetates, benzoates, oleates, tartrates, and mixtures thereof.

4. The process of claim 1 wherein of said copper-containing additive is a water soluble copper salt.

5. The process of claim 1 wherein said heavy liquid hydrocarbonaceous fuel having a nickel, iron, and vanadium-containing ash feedstock is selected from the group consisting of crude residue from petroleum distillation and cracking process operations, petroleum distillate, reduced crude, whole crude, asphalt, coal tar, coal derived oil, shale oil, tar sand oil, and mixtures thereof.

6. The process of claim 1 wherein the fuel feedstock comprises a pumpable slurry of petroleum coke in water, liquid hydrocarbonaceous fuel, or mixtures thereof.

7. The process of claim 1 wherein in (1) said copper-containing additive is introduced into the feed to or the bottoms from a vacuum distillation unit.

8. The process of claim 1 wherein said mixture of copper-containing additive and fuel feedstock from (1) has a particle size such that substantially all of said material passes through a sieve in the range of ASTM E-11 Standard Sieve Designation about 425 microns to 38 microns, or below.

9. The process of claim 1 wherein a comparatively small amount of a comminuted second additive comprising a compound from the group of elements consisting of iron, calcium, magnesium, chromium, and mixtures thereof is mixed with the copper-containing additive and the fuel feedstock in (1).

10. The process of claim 1 wherein substantially all of the sulfur in said feedstock is converted into the sulfides of copper, iron, and nickel and leaves the reaction zone in the slag.

11. The process of claim 1 wherein a supplemental iron and/or calcium compound is introduced into the reaction zone of the partial oxidation reaction zone only at start-up to reduce the softening temperature of the copper-containing addition agent, and then the introduction of said iron and/or calcium compound is discontinued.

12. The process of claim 11 wherein said iron compound is selected from the group consisting of oxide, sulfate, sulfide carbonate, cyanide, chloride, nitrate, and mixtures thereof; and said calcium compound is selected from the group consisting of oxide, sulfate, sulfide, carbonate, and hydroxide.

13. The process of claim 11 wherein said supplemental iron compound may be introduced into the reaction zone in the amount of about 1.0 to 10.0 wt. % of said copper-containing addition agent; and said supplemental calcium compound may be introduced into the reaction zone in the amount of about 2.0 to 8.0 wt. % of said copper-containing addition agent.

14. The process of claim 1 wherein an additional magnesium and/or chromium compound is introduced in the total amount of about 1.0 to about 10.0 wt. % of said copper-containing additive.

15. The process of claim 14 wherein said magnesium and chromium compounds are selected from the group consisting of oxides, hydroxides, carbonates, sulfates, nitrates, and mixtures thereof.

16. The process of claim 1 wherein said liquid phase washing agent substantially comprises in wt. %: copper sulfide about 75 to 95, nickel sulfide about 0.5 to 3.0, copper oxide about about 2 to 9, iron sulfide about 0.4 to 2.0; and iron oxide about 0.1 to 1.0.

17. A process for the production of gaseous mixtures comprising $H_2+CO$ by the partial oxidation of a feedstock comprising a heavy liquid hydrocarbonaceous fuel having a nickel, iron, and vanadium-containing ash or petroleum coke having a nickel, iron, and vanadium-containing ash, or mixtures thereof; and said feedstock includes a minimum of 0.5 wt. % of sulfur; and said ash includes a minimum of 5.0 wt. % vanadium, a minimum of 0.5 ppm nickel and a minimum of 0.50 ppm iron; said process comprising:

(1) mixing together a copper-containing additive with said feedstock; wherein the weight ratio of copper-containing additive to ash in the fuel feedstock is in the range of about 1.0–10.0, and there is at least 10 parts by weight of copper for each part by weight of vanadium.

(2) coking said mixture from (1) to produce petroleum coke having a nickel, iron, and vanadium-containing ash and having dispersed therein said copper-containing additive;

(3) introducing the petroleum coke from (2) into the partial oxidation reaction zone in (4) as a pumpable slurry of petroleum coke in water, liquid hydrocarbonaceous fluid or mixtures thereof, or as substantially dry petroleum coke entrained in a gaseous transport medium; and (4) reacting said petroleum coke from (3) at a temperature in the range of b 2200° F. to 2900° F. and a pressure in the range of about 5 to 250 atmospheres in said free-flow refractory lined partial oxidation reaction zone with a free-oxygen containing gas in the presence of a temperature moderator and in a reducing atmosphere to produce a hot raw effluent gas stream comprising $H_2+CO$ and entrained molten slag; and where in said reaction zone said copper-containing additive combines with a portion of said nickel and iron constituents and sulfur found in the feedstock to produce a liquid phase washing carrier that collects and transports a portion of the vanadium-containing oxide laths and spinels and other ash components and refractory out of the reaction zone, and;

(5) separating nongaseous materials from said hot raw effluent gas stream.

18. The process of claim 17 wherein said copper-containing additive comprises a copper compound selected from the group consisting of oxide, sulfide, sulfate, carbonate, cyanide, chloride, nitrate, and mixtures thereof.

19. The process of claim 17 wherein said mixture of copper-containing additive and feedstock from (1) has a particle size such that substantially all of said material passes through a sieve in the range of ASTM E-11 Standard Sieve Designation of about 425 microns to 38 microns or below.

20. The process of claim 17 wherein said copper-containing additive comprises an inorganic or organic compound of copper.

21. The process of claim 17 wherein said ash-containing heavy liquid hydrocarbonaceous fuel is a high boiling liquid petroleum feed to or the bottoms from a vacuum tower or a fractionator.

22. The process of claim 17 where in (2) the mixture from (1) at a temperature in the range of about 650° F. to 930° F. is introduced into a delayed coking zone where at a temperature in the range of about 800° F. to 895° F. and a pressure in the range of about 20 to 60 psig, uncondensed hydrocarbon effluent vapor and steam are removed overhead and said petroleum coke having a nickel, iron, and vanadium-containing ash and having uniformly dispersed therein said copper-containing additive is removed from the bottom.

23. The process of claim 17 where in (2) the mixture from (1) at a temperature in the range of about 550° F. to 750° F. is introduced into a fluidized bed coking zone where at a temperature in the range of about 1000° F. to 1200° F. and a pressure in the range of about 10 to 20 psig, uncondensed hydrocarbon efflent vapor and steam are removed overhead and said petroleum coke is removed from the bottom.

24. The process of claim 17 where in (5) said nongaseous materials are separated from said hot efflluent gas stream by contacting the gas stream from (4) with a water or oil scrubbing medium.

25. The process of claim 17 wherein a comparatively small amount of a comminuted second additive comprising a compound from the group of elements consisting of iron, calcium, magnesium, chromium, and mixtures thereof is mixed with the copper-containing additive and the feedstock in (1); and said second additive is uniformly dispersed in the petroleum coke produced in (2).

26. The process of claim 17 wherein magnesium and/or chromium compound is introduced as said second additive in the total amount of about 1.0 to 10.0 wt. % of said copper-containing additive.

27. The process of claim 26 wherein said magnesium and chromium compounds are selected from the group consisting of oxides, hydroxides, carbonates, sulfates, nitrates, and mixtures thereof.

28. The process of claim 17 wherein substantially all of the sulfur in said feedstock is converted into the sulfides of copper, iron, and nickel and leaves the reaction zone in the slag.

29. The process of claim 17 wherein a supplemental iron and/or calcium compound is introduced into the reaction zone of the partial oxidation reaction zone only at start-up to reduce the softening temperature of the copper-containing addition agent, and then the introduction of said iron and/or calcium compound is discontinued.

30. The process of claim 29 wherein said iron compound is selected from the group consisting of oxide, sulfate, sulfide carbonate, cyanide, chloride, nitrate, and mixtures thereof; and said calcium compound is selected from the group consisting of oxide, sulfate, sulfide, carbonate, and hydroxide.

31. The process of claim 29 wherein said supplemental iron compound may be introduced into the reaction zone in the amount of about 1.0 to 10.0 wt. % of said copper-containing addition agent; and said supplemental calcium compound may be introduced into the reaction zone in the amount of about 2.0 to 8.0 wt. % of said copper-containing addition agent.

* * * * *